Patented Apr. 17, 1928.

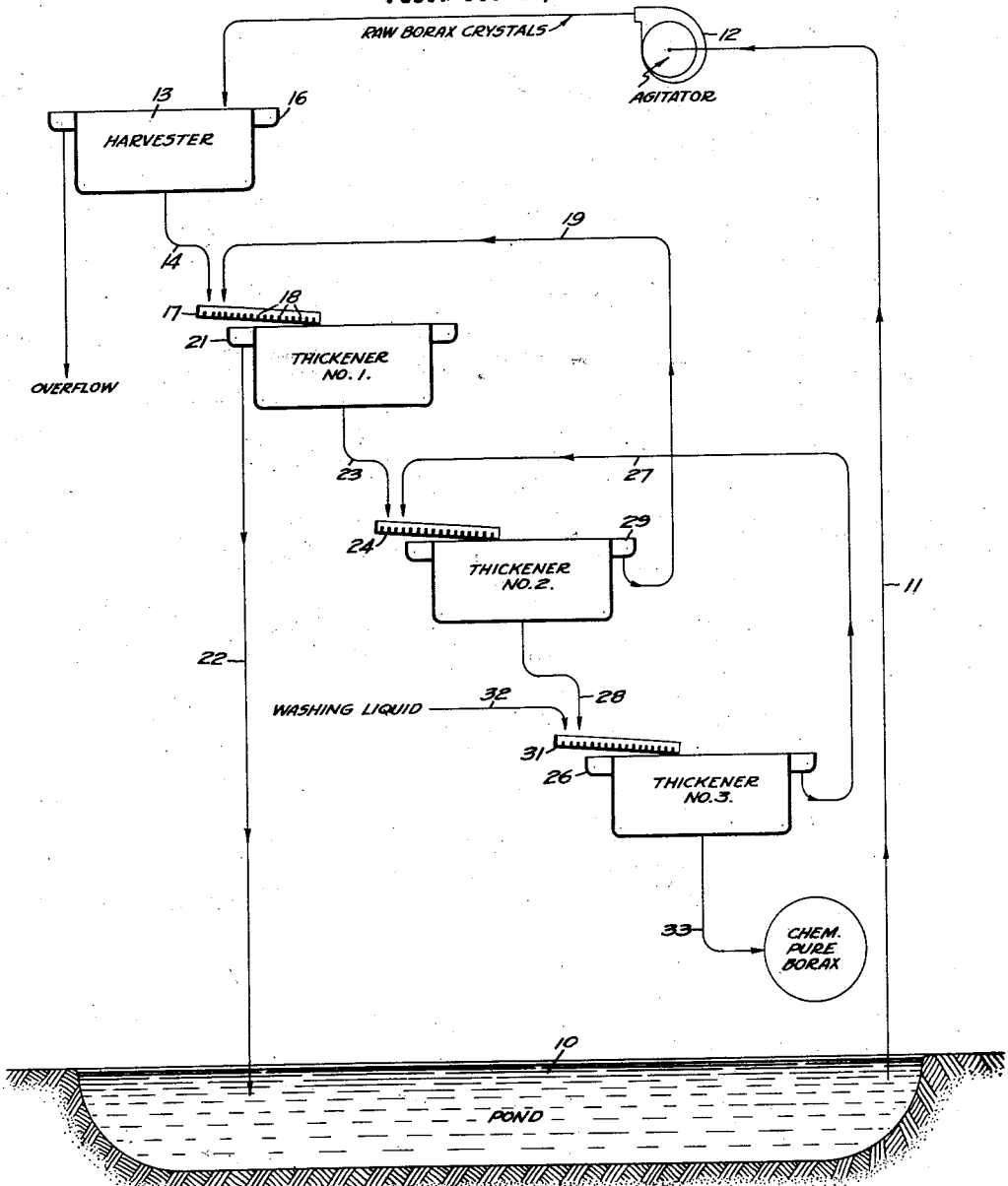

1,666,733

UNITED STATES PATENT OFFICE.

GEORGE B. BURNHAM, OF RENO, NEVADA, ASSIGNOR TO BURNHAM CHEMICAL COMPANY, OF RENO, NEVADA, A CORPORATION OF NEVADA.

PROCESS OF WASHING SALTS.

Application filed December 19, 1925. Serial No. 76,408.

The invention relates to a method of removing impurities from a salt by means of a counter flowing current of washing liquid.

An object of the invention is to provide an inexpensive process for removing impurities from a salt.

Another object of the invention is to provide a process by means of which a chemically pure salt may be obtained from a mixture of salts containing the same and adulterant salts.

A further object of the invention is to provide a counter flow washing process which may be continuously operated.

The invention possesses other advantageous features, some of which with the foregoing, will be set forth at length in the following description where I shall outline in full the preferred form of the process which is diagrammatically illustrated in the drawings accompanying and forming part of the present specification. In said drawings I have shown one form of apparatus for practicing the process of my invention, but it is to be understood that I do not limit myself to such form, since the invention as set forth in the claims may be embodied in a plurality of forms. In the drawings:

The figure is a diagrammatic representation of the process of my invention.

Broadly speaking, the invention comprises obtaining the salt having the lowest solubility and solubility rate from a mixture of salts by exposing the mixture of salts to a current of washing liquid in which all the salts dissolve except the one having the lowest solubility and solubility rate, and separating the liquid from the undissolved salt.

For convenience in explanation, the process will be described as it is used to obtain chemically pure borax from the brine of Searles Lake, California, but it will be appreciated that the process is well adapted for use with other brines and for obtaining other salts.

The process is primarily intended to obtain a chemically pure crystalline salt from a mixture of various salt crystals. At Searles Lake, the crystals are obtained by evaporating the naturally occurring brine in large ponds exposed to the action of the sun and wind. The brine contains ions and molecules of various substances which are continually combining and separating to form a multiplicity of compounds. Such a complex liquor has most of the characteristics of a simple solution; there are a few exceptions, the principal one of which probably being that crystallization of salts from the liquor does not take place as rapidly as in a simple solution.

It has been found that upon proper concentration of the saline liquor a number of salts may be precipitated as crystals containing more or less impurities. The precipitation is usually accelerated by agitation of the liquor and a typical yield contains crystals of borax, and two or more of the following salts to-wit: sodium chloride, Glazerite or potassium sodium sulfate, Gauslinite or sodium carbonate sulfate, sodium carbonate, and sodium sulfate. Of the deposited salts the borax has the lowest solubility and the lowest rate of solubility, and my process is for obtaining chemically pure borax crystals from such a mixture of salts.

The saline liquor is exposed in an evaporating pond 10 to the action of the atmosphere and of the sun to evaporate the liquor and to cool it at night to bring it to supersaturation with a number of salts, and is then withdrawn thru a suitable pipe line 11, by means of a pump 12. The agitation of pumping starts the crystallization of the salts from the brine and the mixture of various salt crystals and brine discharged from the pump is introduced into a tank or harvester 13, in which the crystallization continues. The salt crystals settle to the bottom of the harvester and the remaining brine, being substantially free of crystals, overflows the harvester into an overflow launder 16 from which it is allowed to go to waste or is preferably discharged into the evaporating pond 10, in which it is again evaporated until it is supersaturated.

The mixture of crystals, for convenience called "raw borax crystals", together with a small amount of brine, is conducted from harvester 13 thru a pipe 14 and empties upon a trough 17 provided with a number of transverse baffles or riffles 18. The small amount of brine carried along by the raw borax crystals is augmented by a current of washing liquid also discharged onto the riffle trough 17 by a pipe line 19. This washing liquid has already been used in a part of the process presently to be described, and contains in solution some of the salts regarded as impurities in the borax as well as a small percentage of borax. The washing liquid is not saturated however, and in commingling with the raw borax crystals in their turbulent flow over the riffle trough 17, it dissolves a large part of the salts in the mixture which have higher solubilities and higher rates of solubility than the borax. The thorough mixing of the raw crystals with the washing liquid, due to the agitation caused by the riffles on the riffle trough, is very effective in aiding the liquid to dissolve the undesired salt crystals. Some of the borax is also dissolved but the rate of solubility of borax is compartively low so that little is lost in that manner. From the riffle trough 17 the partially purified borax crystals and the washing liquid with some of the adulterant salts in solution are discharged into a thickener, designated as "Thickener No. 1" in the drawing. The thickener is of the usual type and preferably comprises a tank equipped with a number of revolving blades which propel the crystals which have settled to the bottom of the tank toward a central discharge aperture therein. The agitation in the thickener, due to the revolving blades, also helps to dissolve in the washing liquid as much as possible of the salt crystals regarded as impurities. The crystals raked to the discharge opening are compacted so that the discharged matter contains but a small amount of liquid. The liquor left behind overflows the rim of the thickener and is caught in an overflow launder 21 provided around the upper periphery of the tank. It is practically saturated with the various undesired salts and contains some borax as well and is conducted thru a pipe 22 to the pond 10 in which it is evaporated and from which it is subsequently withdrawn by the pump.

The partially purified raw borax crystals are carried from thickener No. 1 thru a pipe 23 to a second riffle trough 24, similar to trough 17, and on which they are thoroughly mixed with and washed by liquid from the overflow launder 26 of another thickener shown as No. 3 in the drawings. The washing liquid from launder 26 conducted to riffle trough 24 through pipe line 27 contains a small amount of salts in solution as will appear in the description to follow. It is capable, however, of dissolving most of the remaining adulterant salts in the partially purified borax from thickener No. 1 and in addition dissolves a small portion of borax crystals. The nearly purified borax crystals together with the washing liquid flow from trough 24 into thickener No. 2, similar to thickener No. 1. In the second thickener, further solution of adulterant salts in the washing liquid takes place and the nearly pure borax crystals collect on the bottom of the thickener. The washing liquid overflows into launder 29 of thickener No. 2. It is substantially free of crystals and is by no means saturated after it has washed the salt in the thickener, and as it collects in the overflow launder, it is conducted thru pipe line 19 and is discharged onto riffle trough 17 as before described.

The nearly pure borax crystals are discharged from thickener No. 2 thru pipe 28 onto riffle troughs 31, similar to the other riffle troughs and are mixed with and washed by fresh washing liquid from a suitable source and introduced thru a pipe 32. This washing liquid is preferably pure water but at Searles Lake I have had good results using the brackish water available. On riffle trough 31 and in thickener No. 3, similar to the others and into which the washing liquid and crystals discharge, the remaining adulterant salts are dissolved. Some borax also is dissolved but the greater proportion is unaffected due to its low solubility and low rate of solubility. The launder 26 receives used washing liquid from thickener No. 3 which is capable of dissolving further amounts of the adulterant salts and is consequently conducted through pipe 27 and empties onto riffle trough 24, as described previously. The crystals remaining in thickener No. 3 are those of chemically pure borax, all the adulterant crystals having been dissolved and removed, and the pure borax crystals are expelled thru the discharge aperture in the thickener and are carried by a conduit 33 to a suitable storage place, designated in the drawings by the circle labelled "Chemically pure borax", or else are filtered to remove the wash water and are then dried and stored.

It will be seen that the process comprises counterflowing a current of raw borax or mixture of crystals and a current of washing liquid so that the washing liquid dissolves all the salts from the mixture and leaves chemically pure borax, and also so that the freshest washing liquid comes into contact with the purest salt and the used washing liquid is employed to remove some of the adulterant salts from the raw borax.

I claim:

1. The process of separating borax from a mixture of salts containing the same and salts of greater solubility which comprises flowing the mixture in one direction and washing the mixture with a liquid flowing in the opposite direction.

2. The process of obtaining borax from a mixture of salts containing the same and salts of greater solubility which comprises flowing the mixture in one direction, washing the mixture with a counterflowing current of brackish water in which the salts of greater solubility dissolve, and collecting the borax.

3. The process of separating borax from a mixture containing borax and impurities of greater solubility which comprises counterflowing in a series of containers the mixture and a washing liquid in which the impurities dissolve, the proportion of impurities in the mixture and of dissolved impurities in the washing liquid being relatively high in the initial container, and the proportion of impurities in the mixture and of dissolved impurities in the washing liquid being relatively low in the final container.

4. The process of obtaining borax from a mixture of salts containing borax, sodium chloride, and other salts which comprises introducing the mixture of salts into a container, dissolving portions of the salts in liquid from a second container; discharging the liquid into an evaporating pond, introducing the remaining portions of the salts into the second container, dissolving additional portions of the salts in liquid from a third container; introducing the balance of the salts into a third container, dissolving the remaining portions of the salts except borax in liquid from a source of washing liquid, and collecting the remaining pure borax.

5. The process of separating a salt from a mixture of salts containing the same and salts of greater solubility which comprises exposing all the salts to the action of a washing liquid in a plurality of containers arranged to be used in series, the salts progressing through the series in one direction and the liquid progressing through the series in the opposite direction, and agitating said salts on a riffle trough with washing liquid prior to their introduction into each of said containers.

6. The process of separating a salt from a mixture of salts containing the same and salts of greater solubility which comprises agitating the salts with a washing liquid on a riffle trough, introducing the salts and the liquid into a container, and separating the salts from the liquid.

7. The process of obtaining a salt of lesser solubility from a mixture of salts containing the same and salts of greater solubility which comprises crystallizing the salts, flowing them through a series of containers, agitating them on a riffle trough with a washing liquid prior to their introduction into each container, and collecting the salt from the last container.

8. The process of obtaining a salt from a brine supersaturated with the same and other salts of greater solubility which comprises agitating the brine to crystallize the salts, separating most of the brine from the crystals of the salts, agitating the crystals of the salts on a riffle trough with a washing liquid containing in solution a large proportion of the salts and in which a portion of the crystals of the salts of greater solubility dissolve, introducing the crystals of the salts and the washing liquid into a container, separating the crystals of the salts from the liquid in the container, agitating the remaining crystals of the salts on a riffle trough with a washing liquid containing in solution an intermediate proportion of the salts and in which an additional portion of the crystals of the salts of greater solubility dissolve, introducing the remaining crystals of the salts and the washing liquid into a second container, separating the remaining crystals of the salts from the liquid in the second container, agitating the finally remaining crystals of the salts on a riffle trough with a washing liquid containing in solution a small proportion of the salts and in which the remaining crystals of the salts of greater solubility dissolve, introducing the remaining crystals of the salt and the washing liquid into a third container, and separating the finally remaining salt from the liquid in the third container.

In testimony whereof, I have hereunto set my hand.

GEORGE B. BURNHAM.